(12) United States Patent
Keller et al.

(10) Patent No.: US 12,655,815 B2
(45) Date of Patent: Jun. 16, 2026

(54) METHOD OF OPERATING AN INTERNAL COMBUSTION ENGINE AND CORRESPONDING ARRANGEMENT

(71) Applicant: LINDE GMBH, Pullach (DE)

(72) Inventors: Tobias Keller, Pullach (DE); Christian Voss, Pullach (DE); Martin Bauer, Pullach (DE); Patrick Schiffmann, Pullach (DE); Alexander Siemens, Pullach (DE); Oliver Purrucker, Pullach (DE)

(73) Assignee: Linde GmbH, Pullach (DE)

( * ) Notice: Subject to any disclaimer, the term of this patent is extended or adjusted under 35 U.S.C. 154(b) by 0 days.

(21) Appl. No.: 18/870,182

(22) PCT Filed: May 31, 2023

(86) PCT No.: PCT/EP2023/025260
§ 371 (c)(1),
(2) Date: Nov. 27, 2024

(87) PCT Pub. No.: WO2023/232291
PCT Pub. Date: Dec. 7, 2023

(65) Prior Publication Data
US 2025/0327431 A1 Oct. 23, 2025

(30) Foreign Application Priority Data
Jun. 2, 2022 (EP) .................................... 22020255

(51) Int. Cl.
*F02M 21/02* (2006.01)
*C01B 3/501* (2026.01)
(Continued)

(52) U.S. Cl.
CPC ......... *F02M 21/0206* (2013.01); *C01B 3/501* (2013.01); *C10L 3/101* (2013.01); *F02B 43/12* (2013.01); *C01B 2203/0405* (2013.01)

(58) Field of Classification Search
CPC ................ F02M 21/0206; C01B 3/501; C01B 2203/0405; C10L 3/101; F02B 43/12
See application file for complete search history.

(56) References Cited

U.S. PATENT DOCUMENTS 4,330,237 A 5/1982 Battah
4,857,078 A 8/1989 Watler
(Continued)

FOREIGN PATENT DOCUMENTS

CN 101544528 B * 11/2014 ............... C10K 3/04
CN 108443010 A * 8/2018 ............... C25B 1/04
(Continued)

*Primary Examiner* — Hung Q Nguyen
(74) *Attorney, Agent, or Firm* — Millen, White, Zelano & Branigan, P.C.; Brion P. Heaney

(57) ABSTRACT

A method of operating an internal combustion engine specified to be run with a fuel gas mixture comprising at least one hydrocarbon and hydrogen in a maximum specified hydrogen content using a pipeline gas withdrawn from a pipeline and comprising the at least one hydrocarbon and a hydrogen content exceeding the maximum specified hydrogen content is provided. The pipeline gas is at least in part subjected to a hydrogen depletion to yield a hydrogen depleted gas mixture not exceeding the maximum specified hydrogen content. Said hydrogen depleted gas mixture is at least in part used as the fuel gas and said hydrogen depletion includes a membrane separation. A corresponding arrangement is also part of the present invention.

13 Claims, 1 Drawing Sheet

(51) Int. Cl.
    *C10L 3/10*         (2006.01)
    *F02B 43/12*       (2006.01)

(56)            References Cited

U.S. PATENT DOCUMENTS

| | | | | |
|---|---|---|---|---|
| 5,229,102 | A * | 7/1993 | Minet | C01B 3/323 |
| | | | | 123/3 |
| 5,705,916 | A | 1/1998 | Rudbeck et al. | |
| 6,090,312 | A * | 7/2000 | Ziaka | C01B 3/501 |
| | | | | 44/457 |
| 8,394,174 | B2 * | 3/2013 | Chen | C01B 3/56 |
| | | | | 95/55 |
| 8,408,005 | B2 * | 4/2013 | Panuccio | F01K 23/068 |
| | | | | 60/780 |
| 9,221,739 | B2 | 12/2015 | Malofsky et al. | |
| 9,302,227 | B2 | 4/2016 | Lokhandwala | |
| 2004/0142220 | A1 * | 7/2004 | Brenner | H01M 8/0612 |
| | | | | 422/187 |
| 2004/0146760 | A1 * | 7/2004 | Miwa | H01M 16/006 |
| | | | | 429/425 |
| 2012/0291482 | A1 * | 11/2012 | Terrien | C01B 3/36 |
| | | | | 62/619 |
| 2014/0107388 | A1 * | 4/2014 | Lokhandwala | C10L 3/101 |
| | | | | 585/818 |
| 2014/0165829 | A1 | 6/2014 | Sharma et al. | |
| 2016/0130516 | A1 * | 5/2016 | Edlund | C10L 3/101 |
| | | | | 48/127.9 |
| 2022/0143549 | A1 | 5/2022 | Bauer et al. | |

FOREIGN PATENT DOCUMENTS

| | | | | |
|---|---|---|---|---|
| GB | 2592695 A * | 9/2021 | | C01B 3/505 |
| WO | WO-9965097 A1 * | 12/1999 | | H01M 8/0612 |
| WO | 2009/150679 A1 | 12/2009 | | |
| WO | 2010/006910 A1 | 1/2010 | | |
| WO | WO-2019180032 A1 * | 9/2019 | | C01B 3/503 |

* cited by examiner

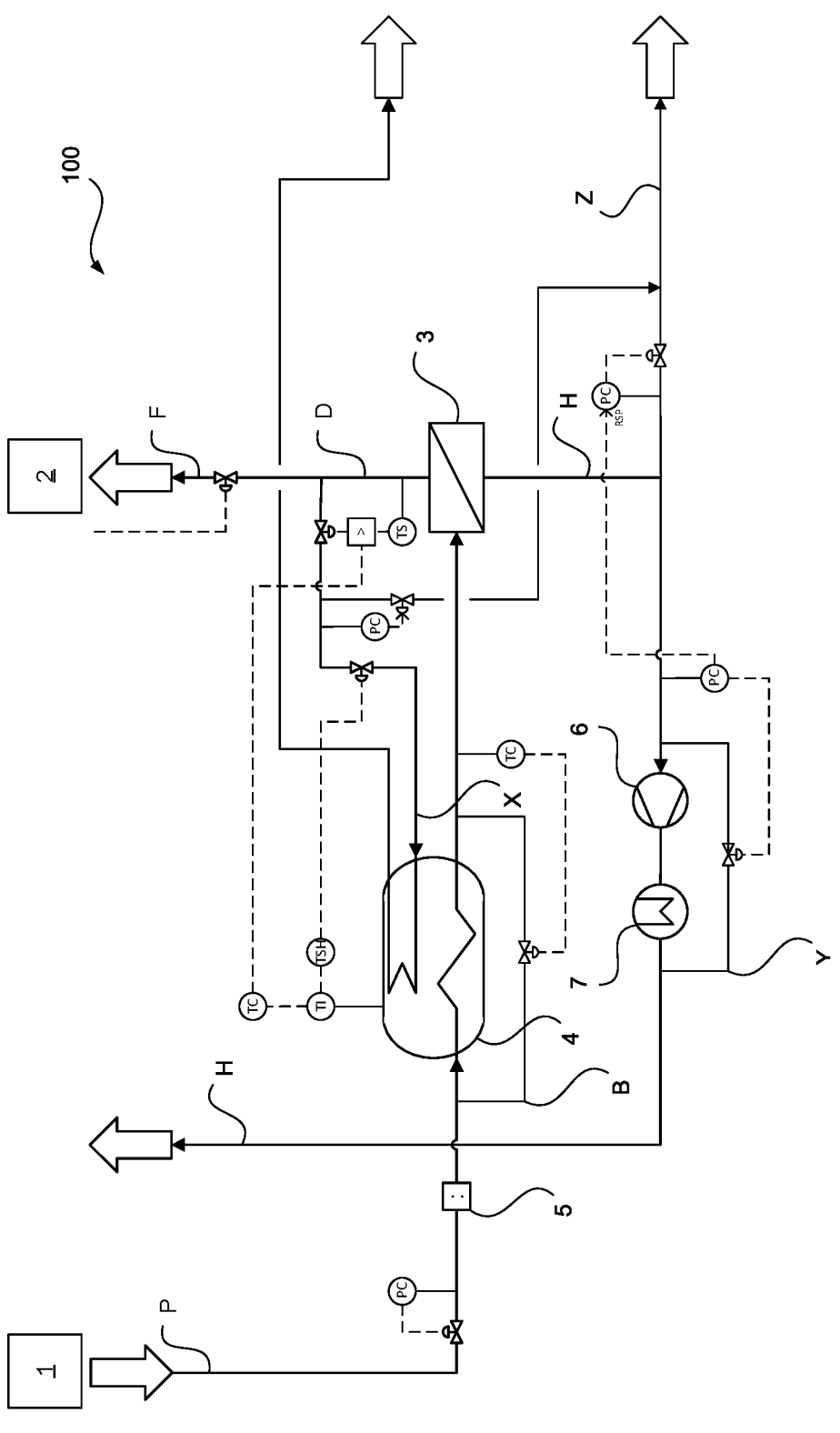

METHOD OF OPERATING AN INTERNAL COMBUSTION ENGINE AND CORRESPONDING ARRANGEMENT

The present invention relates to a method of operating an internal combustion engine such as a gas engine and to a corresponding arrangement.

BACKGROUND

In the so-called hydrogen economy, hydrogen is used to decarbonize economic sectors which are difficult to electrify. As part of discussions on hydrogen economy, one topic is to which extent existing natural gas infrastructure can be used to transfer and utilize hydrogen. In this connection, various items are examined for hydrogen readiness and potential limitations, e.g., applied materials, compressors, natural gas storage facilities, and various natural gas consumers which use natural gas as feedstock (chemical industry) or fuel gas (power plants, process plants, domestic users, etc.).

Internal combustion engines (gas turbines and gas engines) are particularly sensitive towards an increasing hydrogen content of their fuel gas if this has not been considered in the design phase. Thus, many of the systems currently in operation must either be retrofitted for the use with hydrogen-rich fuel gases or must be expanded by an upstream membrane unit for fuel gas conditioning.

U.S. Pat. No. 5,705,916 A describes a process in which a gas turbine and a membrane essentially permeable for hydrogen are combined. WO 2010/006910 A1 discloses separation of carbon dioxide and methane, wherein a permeate is used as a fuel gas. WO 2009/150679 A1 relates to hydrogen separation and proposes using a retentate as a fuel gas. U.S. Pat. No. 9,221,739 B2 discloses a separation of methane and higher hydrocarbons. A permeate is used as a fuel gas. Similar subject matter is disclosed in US 2014/0165829 A1 and U.S. Pat. No. 9,302,227 B2.

While adding a membrane unit for fuel gas conditioning can be a cost-effective way to enable a future use of existing internal combustion engines, this particularly comes with some challenges when an automatic start with short starting time is required.

The present invention has the object of overcoming such disadvantages of the prior art of fuel gas conditioning in the context mentioned.

DISCLOSURE OF THE INVENTION

According to the present invention, a method of operating an internal combustion engine and a corresponding arrangement comprising the features of the independent claims is provided. Preferred embodiments are the subject of the dependent claims and of the description that follows.

The internal combustion engine used according to embodiments of the present invention is specified to be run with a fuel gas mixture comprising at least one hydrocarbon and hydrogen in a maximum specified hydrogen content. For providing the fuel gas mixture, or as the fuel gas mixture, a pipeline gas withdrawn from a pipeline and comprising the at least one hydrocarbon and a hydrogen content exceeding the maximum specified hydrogen content is used. Preferably, the remaining pipeline gas is further transported through the pipeline after being recompressed by a pipeline compressor driven by the internal combustion engine.

According to embodiments of the present invention, the pipeline gas is at least in part subjected to a hydrogen depletion to yield a hydrogen depleted gas mixture not exceeding the maximum specified hydrogen content, said hydrogen depleted gas mixture being at least in part used as the fuel gas and said hydrogen depletion including a membrane separation. Said pipeline gas is at least in part subjected to a heating step before being subjected to the hydrogen depletion when a temperature of the pipeline gas is determined to be below a specified temperature.

With increasing hydrogen contents in natural gas pipeline networks, membrane separation steps to deplete a corresponding gas mixture of hydrogen can be a cost-effective way to enable future use of existing combustion engines that have not been designed for hydrogen-rich fuel gases, as mentioned. By using a heater, particularly an indirect fired or bath heater according to embodiments of the present invention, equipment (e.g. a membrane and permeate compressor) can be designed without the need for overdesign due to varying temperatures and short starting times can therefore be realized, e.g. in cases a hydrogen content in a pipeline is detected to be above the specified maximum hydrogen content, as now will be further explained.

Generally, a membrane separation step or process involves using a membrane, i.e. a separation layer which may be semi-permeable or selectively permeable for certain components of a mixture to be separated. The membrane may comprise or consist of manufactured materials such as ceramics or one or more polymers, particularly glassy or rubbery polymers. Polymers may include, for example, multiblock copolymers of polyethylene glycol, polyimide and polyamide, or silicone-based polymers such as polydimethylsiloxane. A membrane may be configured as a flat membrane in the form of a (wound) foil, or as a hollow fibre membrane in the form of a bundle of fibres, also referred to as a "membrane cartridge." As to specific explanations, reference is made to expert literature such as H. Strathmann, "Membrane Separation Processes, 1. Principles," Ullmann's Encyclopedia of Industrial Chemistry, online publication 15 October 2011, Wiley VCH, https://doi.org/10.1002/14356007.a16_187.pub3.

Herein, the expression "permeate" is used to refer to a fraction penetrating a membrane used in a membrane separation process. A "retentate," in contrast, is the fraction retained by a membrane. In the present case, hydrogen, on account of its smaller molecular size, preferentially passes through a membrane used, forming a major part of the permeate, but hydrocarbons are predominantly retained, forming a major part of the retentate. As in any separation process, membrane separation processes are also not achievable with any desired selectivity of separation, and so a certain part of the components predominantly being transferred into the permeate (here hydrogen) typically remain in the retentate as well. The same also applies to the components predominantly remaining in the retentate. Such components are also to a certain extent transferred into the permeate.

Membrane systems for fuel gas conditioning (i.e. selective removal of hydrogen) can be a more cost-effective way to enable future use of existing combustion engines with increasing hydrogen contents in natural gas pipelines, as mentioned. However, pressures and temperatures in natural gas pipeline networks vary in wide range depending on the required natural gas flow and the seasonal temperature. These fluctuations are advantageously compensated according to embodiments of the present invention without a requirement for overdesign.

The separation capacity for hydrogen of a membrane system depends on the pressure difference (and thus the natural gas inlet pressure of a pipeline) and the operating temperature (a higher permeance of the membrane is observed at a higher temperature). Designing the membrane system for the minimum inlet pressure and temperature and operating said system with varying pressure and temperature would result in an active membrane surface greater than what is required for most of the time. In addition, this would result in large fluctuations in permeate flow, thus affecting operation of the permeate compressor. This should be avoided and is avoided according to embodiments of the present invention.

By installing a feed heater upstream of the membrane, according to embodiments of the present invention, operating temperatures equal or higher than the maximum temperature of the pipeline natural gas can be maintained. Thus, a smaller membrane surface area (less membrane modules) is required. For applications in which short starting times for combustion engines are important the membrane system must be kept at operating temperature while on stand-by since heating up is typically the most time-consuming step during start-up.

The most effective way (and only way without electrical power supply) is to insulate the membrane system and to route hot gas through the membrane to make up for any heat loss to the environment. Typically, a minimum flow rate is required to effectively introduce heat into a system. However, without any consumer at a lower pressure level no gas flow through the membrane system can be established due to its inherent pressure drop. Therefore, this gas stream must either be re-compressed (resulting in additional costs) or sent to a flare (resulting in a loss of natural gas). Preheating according to embodiments of the present invention overcomes this problem.

According to an embodiment of the present invention, as mentioned, said heating step is performed using an indirect fired or bath heater. The advantage of this type of heater is that the heating fluid can store thermal energy and that at least a part of the gas routed through the membrane system can be used as fuel for the heater. The operating temperature of the heating fluid can be maintained with a temperature controller during normal operation while during stand-by phases the heating fluid can be heated to higher temperatures to store thermal energy. A high temperature limit switch limits the heating fluid temperature if the heating fluid's temperature limit is reached before the membrane stage has reached the upper temperature limit of its two-step controller in the retentate stream.

Indirect (bath) heaters are, as e.g. discussed by C. Jenner, "Indirect Bath Heaters," 2012, http://processprinciples.com/2012/08/indirect-bath-heaters/, used to heat process fluids, wherein the heating mechanism takes place indirectly through a bath fluid, as opposed to heating directly by flame or furnace. The use of a bath fluid promotes uniform heating and reduces the chance of hotspots. The "indirect" heating is realized by submerging a fire tube through which combustion gases of a fuel gas are passed through the bath fluid. The bath fluid may be water, but depending on the climate and heating requirements it can also be oil or a mixture of water and glycol.

According to embodiments of the present invention, a starting time of the membrane system can be reduced to the time period needed to depressurize the permeate side of the membrane and thus establishing the driving force for the separation.

According to an embodiment of the present invention, the heating step, preferably the flow rate of the fuel gas to the indirect fired or bath heater, is controlled using a temperature of a liquid bath of the indirect fired or bath heater and a temperature of a stream from the hydrogen depletion, preferably the hydrogen depleted outlet stream of the depletion. This allows for a reliable and reproducible heating of the pipeline gas.

According to an embodiment of the present invention, in a stand-by phase when the internal combustion engine is temporarily not in operation, a part of the retentate stream is used as fuel gas for the indirect fired or bath heater to maintain the temperature of the heating fluid between a lower limit and an upper limit and, if necessary, a second part of the retentate stream is recycled or discharged e.g., to a flare in a controlled way to keep gas flowing through the membrane and thus keeping the membrane at a certain temperature so that a quick start can be realized. The flow rate of the fuel gas for the indirect fired or bath heater and the discharge stream (the second part) is controlled based on the temperature of the heating fluid inside the indirect heater and the membrane retentate. Preferably, the discharge (or recycled) stream is controlled by a pressure controller PC in the fuel gas for the heater, so that the flow rate of the second part stream is automatically adapted to the flow rate of the heater fuel gas which is controlled based on the temperature in the indirect heater, for instance when the heating fluid temperature reaches the upper temperature limit which causes a TSH-controller to reduce or stop heater fuel gas supply which will then cause the pressure controller to start or increase the second part stream.

According to an embodiment of the present invention, the indirect or bath heater is heated using a part of the hydrogen depleted gas mixture, making the heating essentially independent from further gas sources or electricity.

In an embodiment, the hydrogen depleted gas mixture is withdrawn from the hydrogen depletion as a retentate stream and a hydrogen enriched stream is withdrawn from the hydrogen depletion as a permeate stream.

The hydrogen enriched stream may particularly be withdrawn from the hydrogen depletion using a permeate compressor lowering a pressure at a permeate side of the membrane separation and thus allowing for an advantageous pressure drop. According to an embodiment, the hydrogen enriched stream may particularly be reintroduced into the pipeline as a recycle stream in order to save energy.

In an embodiment of the present invention, the membrane separation is performed using a glassy polymeric membrane. Polymeric membranes have been found to be of advantage in certain gas separations. Such polymeric membranes include glassy and rubbery membranes. Glassy membranes may e.g. be produced from polyimides, polysulfones, polycarbonates, polyamides, polyarylates and polypyrrolones, while rubbery membranes are most typically produced from compounds such as polydimethylsiloxane (PDMS).

An arrangement including an internal combustion engine specified to be run with a fuel gas mixture comprising at least one hydrocarbon and hydrogen in a maximum specified hydrogen content is also provided. The arrangement includes, or is connected to, a pipeline, wherein a pipeline gas withdrawn or withdrawable from said pipeline at least during certain periods of time comprises at least one hydrocarbon and a hydrogen content exceeding the maximum specified hydrogen content. Preferably, there are multiple such arrangements along the pipeline. In one embodiment, the pipeline gas is withdrawn from the main pipeline gas and goes through the hydrogen depletion unit. The retentate stream is consumed in the internal combustion engine and at least a part of the permeate is recycled back to the main pipeline gas. It is also possible, that at least a part of the not consumed retentate stream is recycled back to the main pipeline gas. The main pipeline gas will be further transported to a destination. In another embodiment, there are pipeline compressors arranged along the pipeline to compensate the pressure drop due to the long distance of the transportation. More preferably, the internal combustion engine is used to drive these pipeline compressors.

The arrangement is adapted to subject the pipeline gas at least in part to a hydrogen depletion unit to yield a hydrogen depleted gas mixture not exceeding the maximum specified hydrogen content and to use said hydrogen depleted gas mixture at least in part as the fuel gas. The hydrogen depletion unit includes, or is provided as, a membrane separation unit.

As to features and specific advantages of this arrangement, which preferably is adapted to perform a method as described hereinbefore and embodiments thereof, reference is made to the explanations above. Preferably, this arrangement comprises means adapted to perform a method as described before.

To summarize the advantages of the present invention, the present invention enables further use of existing combustion engines with new fuel gas compositions. According to embodiments of the present invention, an optimized design by membrane operation at a defined design temperature becomes possible. This results in a short starting time by maintaining design operating temperature during stand-by periods. Embodiments of the present invention are suitable for remote locations without power supply, due to an indirect fired or bath heater using fuel gas produced in the method is used.

Advantages of embodiments of the present invention also include minimized operating costs to maintain design operating temperature by selection of a certain heater type. Particularly when a two-step temperature controller is used, flaring is minimized and an automatic operation becomes possible. According to embodiments of the present invention, there is the possibility for heat integration during normal operation (permeate compressor to feed heater).

The internal combustion engine may particularly serve as a mechanical drive for a natural gas pipeline compressor. Preferably, the natural gas pipeline compressor is used to transport the main pipeline gas out of which the pipeline gas is withdrawn. The present invention also may include, as mentioned, a heat integration between the permeate compressor and membrane feed heater. Embodiments of the present invention may also be used in systems in which heat integration is realized by directly routing hot gas from one or more of the compression stages of the permeate compressor through the heating medium of an indirect-fired membrane feed heater.

Further features of the invention are described in connection with the appended figure depicting apparatus according to a preferred embodiment.

SHORT DESCRIPTION OF THE FIGURES

FIG. 1 illustrates a method according to an embodiment of the invention.

EMBODIMENTS OF THE INVENTION

In FIG. 1, a method according to an embodiment of the present invention is schematically illustrated in the form of a simplified process flow diagram and is indicated 100.

Herein, if reference is made to method steps, the corresponding explanations likewise relate to apparatus features and vice versa.

In the method 100, a gas mixture P, herein referred to as a "pipeline gas," is provided. Pipeline gas P may e.g. be withdrawn from a pipeline 1 which is only schematically indicated. Particularly, the pipeline 1 transports the main pipeline gas (not shown) with multiple pipeline gas compressor (not shown) to a destination. This pipeline gas P may particularly be a mixture of methane and optionally other hydrocarbons and hydrogen, a hydrogen content exceeding a maximum specified hydrogen content of a fuel gas F for an internal combustion engine 2, e.g. a gas engine or turbine which is designed to be operated with natural gas especially to drive the pipeline gas compressors.

According to an embodiment of the invention, the pipeline gas P is at least in part subjected to a hydrogen depletion to yield a hydrogen depleted gas mixture D not exceeding the maximum specified hydrogen content. Said hydrogen depleted gas mixture D is then at least in part used as the fuel gas F. Said hydrogen depletion particularly includes a membrane separation 3, particularly making use of a glassy membrane, as repeatedly indicated above.

As shown in FIG. 1, the pipeline gas P is at least in part subjected to a heating step 4 before being subjected to the hydrogen depletion 3 when a temperature of the pipeline gas P is determined to be below a specified temperature. Before, the pipeline gas may be passed through a particulate filter 5. Via an upstream pressure controller PC, an operating pressure during regular and standby operation may be kept constant or essentially constant. As shown, said heating step 4 is performed using an indirect fired or bath heater in which the pipeline gas P is routed through a water or other liquid bath. The indirect fired or bath heater used in the heating step 4 may be operated with a side stream X of a retentate of the membrane separation 3, serving as a fuel gas.

An amount of this fuel gas X may particularly controlled using a "temperature switch high" controller TSH on the basis of a temperature of a liquid bath of the indirect fired or bath heater indicated by a temperature indicator TI, in order to limit the temperature during standby times. During regular operation, a temperature controller TC is used in connection with a thermoswitch TS and a comparator. If the membrane temperature in the hydrogen depletion 3 drops, during a standby, below a certain value, the thermoswitch TS opens and remains open until an upper limit is reached. Using a pressure controller PC acting on a further valve, a flow through the membrane may be kept at a desired value, if the temperature limit of the heating step 4 is reached before the desired membrane temperature is reached. To adjust a temperature of the pipeline gas P downstream of the heating step, a bypass B may be provided which is controlled by a further temperature controller TC. This enables to adjust the gas to a design temperature of a membrane used in the membrane separation 3 if the temperature of the liquid bath is exceedingly high.

As shown, the hydrogen depleted gas mixture D is withdrawn from the hydrogen depletion 3 as a retentate stream and a hydrogen enriched stream H is withdrawn from the hydrogen depletion 3 as a permeate stream. The hydrogen enriched or permeate stream H is withdrawn from the hydrogen depletion 3 using a permeate compressor 6 lowering a pressure at a permeate side of the membrane separation. Operation of said compressor 6, which may be associated with an aftercooler 7, and a further bypass Y around the permeate compressor 6 may be regulated using a pressure controller PC which may be used to hold the permeate pressure constant during normal operation constand or essentially constant. A stream Z, e.g. to a flare, can likewise be regulated using a pressure controller PC.

The invention claimed is:

1. A method of operating an internal combustion engine specified to be run with a fuel gas mixture having a maximum specified hydrogen content, the fuel gas mixture comprising at least one hydrocarbon and hydrogen, the method comprising:

withdrawing a pipeline gas from a pipeline, the pipeline gas comprising at least one hydrocarbon and hydrogen wherein the hydrogen content of the pipeline gas exceeds the maximum specified hydrogen content, subjecting at least a part of the pipeline gas to a hydrogen depletion to yield a hydrogen depleted gas mixture not exceeding the maximum specified hydrogen content, and using at least a part of said hydrogen depleted gas mixture as the fuel gas mixture for the internal combustion engine, wherein said hydrogen depletion includes a membrane separation, and before said pipeline gas is subjected to the hydrogen depletion, subjecting at least a part of said pipeline gas to a heating step, when a temperature of the pipeline gas is determined to be below a specified temperature, using an indirect fired or bath heater, wherein said heating step is controlled using (i) a temperature of a liquid bath of the indirect fired heater or of the bath heater and (ii) a temperature of a stream from the hydrogen depletion.

2. The method according to claim 1, wherein said indirect fired or bath heater is heated using a part of the hydrogen depleted gas mixture.

3. The method according to claim 2, wherein a further part of the hydrogen depleted gas mixture is discharged or otherwise used based on the temperature of the liquid bath of the indirect fired or bath heater and the temperature of the stream from the hydrogen depletion.

4. The method-according to claim 3, wherein the further part of the hydrogen depleted gas mixture is discharged or otherwise used when the internal combustion engine is not in operation.

5. The method according to claim 1, wherein the hydrogen depleted gas mixture is withdrawn from the hydrogen depletion as a retentate stream of the membrane separation, and wherein a hydrogen enriched stream is withdrawn from the hydrogen depletion as a permeate stream of the membrane separation.

6. The method according to claim 5, wherein the hydrogen enriched stream is withdrawn from the hydrogen depletion using a permeate compressor lowering a pressure at a permeate side of the membrane separation.

7. The method according to claim 5, wherein the hydrogen enriched stream is reintroduced into the pipeline as a recycle stream.

8. The method according to claim 1, wherein said membrane separation is performed using a glassy polymeric membrane.

9. The method according to claim 8, wherein said glassy polymeric membrane comprises material selected from polyimides, polysulfones, polycarbonates, polyamides, polyarylates, and polypyrrolones.

10. The method according to claim 1, wherein the pipeline comprises at least one pipeline compressor, and the internal combustion engine is used to drive the pipeline compressor.

11. The method according to claim 1, wherein the liquid bath is water, oil, or a mixture of water and glycol.

12. An arrangement comprising:

an internal combustion engine adapted to be run with a fuel gas mixture comprising at least one hydrocarbon and hydrogen, wherein the fuel gas mixture has a maximum specified hydrogen content, and a pipeline, means for withdrawing a pipeline gas from said pipeline, the withdrawn pipeline gas comprising at least one hydrocarbon and having a hydrogen content exceeding the maximum specified hydrogen content, a hydrogen depletion unit adapted to subject the pipeline gas, at least in part to hydrogen depletion to yield a hydrogen depleted gas mixture not exceeding the maximum specified hydrogen content, wherein said hydrogen depletion unit includes a membrane separation unit means for delivering hydrogen depleted gas mixture, at least in part, to the internal combustion engine as the fuel gas mixture, and an indirect fired or bath heater is arranged upstream of the hydrogen depletion unit.

13. The arrangement according to claim 12, wherein the arrangement is adapted to perform the method according to claim 1.

\* \* \* \* \*